Jan. 15, 1963 W. R. SINCLAIR ET AL 3,073,770
MULLITE SYNTHESIS
Filed April 24, 1961
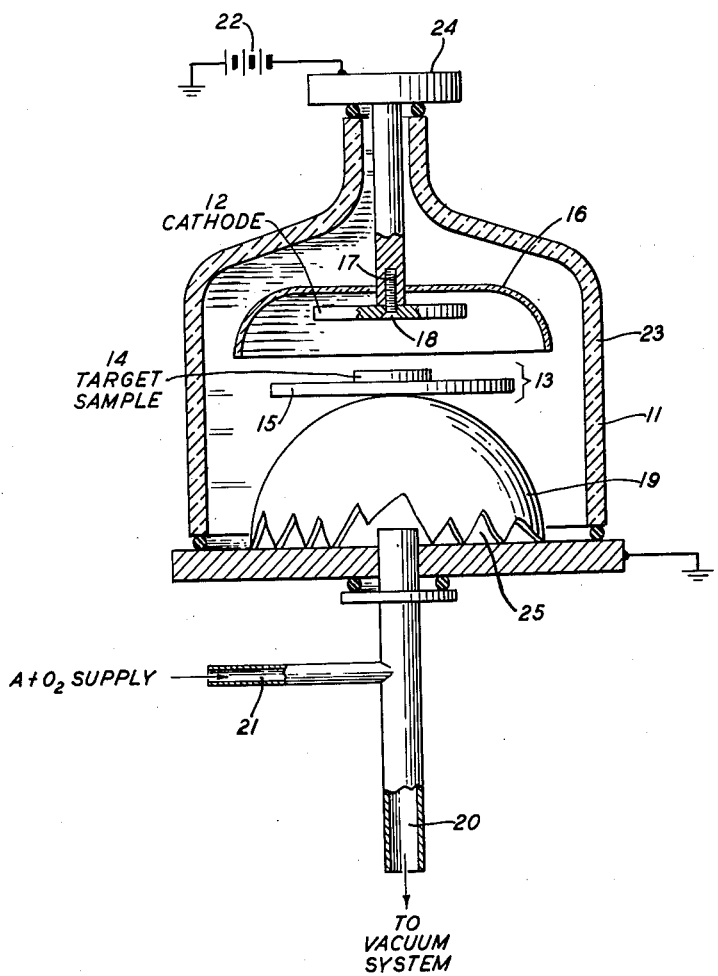
INVENTORS W. R. SINCLAIR
J. C. WILLIAMS
BY
ATTORNEY United States Patent Office 3,073,770
Patented Jan. 15, 1963

3,073,770
MULLITE SYNTHESIS
William R. Sinclair, Summit, and John C. Williams, Whippany, N.J., assignors to Bell Telephone Laboratories, Incorporated, New York, N.Y., a corporation of New York
Filed Apr. 24, 1961, Ser. No. 105,216
4 Claims. (Cl. 204—192)

This invention relates to a method for the preparation of mullite by heat treatment of an amorphous mixture of the oxides of aluminum and silicon deposited by reactive sputtering.

Mullite ($3Al_2O_3 \cdot 2SiO_2$) is the predominant crystalline phase in the ceramic composition and is widely used as the core or substrate for deposited carbon resistors. Mullite is characterized by a needle-like habit and, consequently, has long been considered important in promoting the adherence of the carbon film on the ceramic surface. Further, this material evidences good load-bearing properties and dimensional stability at high temperatures, causing it to be of interest as a super refractory.

Although there are many alumina-silica compositions which occur in the earth's surface and which have been studied by mineralogists, it is only of late that the term "mullite" has been applied to the composition $$(3Al_2O_3 \cdot 2SiO_2)$$

It is a material which is rarely found in nature although many other alumina-silica compositions, such as sillimanite, andalusite, kyanite, montmorillonite, et cetera are found abundantly.

Sillimanite ($Al_2O_3 \cdot SiO_2$) which contains about 67 percent alumina and 33 percent silica is similar in many respects to mullite (72–78% $Al_2O_3$—28–22% $SiO_2$). Both materials are built around columns or chains of alumina octahedra ($AlO_6$) which lie parallel to the C axis. These chains contain about one-half the aluminum atoms in the unit cell and each octahedron shares one edge with the octahedron above and one edge with the one below. The octahedra are joined by X links of alumina and silica tetrahedra which occupy alternate positions. Mullite is essentially an alumina rich sillimanite in which aluminum has been substituted for silicon in the tetrahedral site. It is to these columns of octahedra which the fibrous growth of the alumina silicates is attributed (needle habit).

Few of the naturally occurring alumina-silica compositions have been synthesized with effectiveness by normal manufacturing procedures. Mullite has been no exception to this general rule, although there are two acceptable methods for obtaining it.

Perhaps the most widely used method for obtaining mullite of needle habit is by thermal decomposition of alumina-silica minerals, such as clay or kaolin. Such methods, typically, involve decomposing the mineral composition at temperatures within the range of 900 to 1400° C. It is advantageous in such techniques to add small quantities of the order of 1 percent of a mineralizer such as calcium, barium, or titanium oxides. During the course of the heating of the clay or kaolin the silicon-oxygen or aluminum-oxygen bond is weakened and there is a regrouping to form mullite.

As an alternative to such procedures, synthetic techniques may be employed wherein alumina-silica mixtures are heated at temperatures within the range of 1500 to 1700° C. to form the mullite or wherein the mullite is formed by hydrothermal techniques or by solidification from the melt. The material so produced is chunky in nature and evidences a granular crystal habit rather than the needle-like habit which is desired for device applications.

In accordance with this invention a novel technique is disclosed for the synthesis of mullite evidencing the needle habit in a continuous film wherein an amorphous mixture of the oxides of silicon and aluminum having a composition within the range of 72–78% $Al_2O_3$, remainder $SiO_2$ produced by reactive sputtering is heated at temperatures of at least 1000° C.

The invention will be more easily understood from the following detailed description, taken in conjunction with the accompanying drawing in which:

The FIGURE is a schematic front elevational view of an apparatus suitable for use in producing a film of aluminum-silicon by reactive sputtering.

With reference now, more particularly to the drawing, there is shown in the figure an apparatus suitable for depositing glass film of the oxides of silicon and aluminum by reactive sputtering. Shown in the figure is a vacuum chamber 11 in which are disposed cathode 12 and anode 13. Cathode 12 is composed of an alloy of silicon and aluminum which is to be deposited upon substrate 14.

Platform 15 is employed as a positioning support for substrate 14 upon which the oxide film is to be deposited. Preferred substrate materials for this invention are unglazed ceramics, metals, or any material which will withstand firing at temperatures of the order of 1000° C. and will not react with the sputtered layer to produce an undesired result. Platform 15 may be fabricated from any metal; however it is convenient to use aluminum for this purpose. Glass shield 16 is placed over substrate 14 so as to restrict the deposition to the desired area.

Cathode 12 comprises a disc, 1 to 2 inches in diameter and approximately ¼ inch in thickness. Cathode 12 is connected to an aluminum rod 17 by means of an aluminum screw 18. Rod 17 serves as an electrical connection to the cathode. Cap 24 serves to hermetically seal the system.

Platform 15 is suitably positioned atop aluminum hemisphere 19 which serves to permit uniform dispersion of the gas during the sputtering reaction through aperture 25. Reaction chamber 11 is preferably composed of fused silica. Provision is made for evacuating chamber 11 via conduit 20 through which a mixture of argon and oxygen or oxygen alone enters, via conduit 21, during the sputtering process. Cathode 12 and anode 13, which are electrically insulated by means of Pyrex pipe 23, are biased by source 22.

In operation of the process the vacuum chamber 11 is first evacuated, flushed with an inert gas, as, for example, any of the members of the rare gas family such as helium, argon or neon, and the chamber then re-evacuated. The extent of the vacuum is dependent on consideration of several factors.

Increasing the inert gas pressure and thereby reducing the vacuum within chamber 11 increases the rate at which the material being sputtered is removed from the cathode, and, accordingly, increases the rate of deposition. The maximum pressure is usually dictated by power supply limitations since increasing the pressure also increases the current flow between anode 13 and cathode 12. A practical upper limit in this respect is 50 microns of mercury for a sputtering voltage of 4000 volts. The ultimate maximum pressure is that at which the sputtering can be reasonably controlled within the prescribed tolerances. It follows, from the discussion above, that the minimum pressure is determined by the lowest deposition rate which can be economically tolerated.

After the system has been pumped down, oxygen or oxygen plus argon is admitted into the system via conduit 21. In this manner the pressure is maintained within the range of 10 to 50 microns of mercury.

Next, cathode 12, which is composed of a silicon-aluminum alloy, is made electrically negative with respect to anode 13. The minimum voltage necessary to produce sputtering is of the order of 30 volts D.-C. However, for the particular geometry utilized in describing the present invention, it is preferred to employ a sputtering voltage within the range of 1700 to 1900 volts, a pressure of the order of 25 microns of mercury and a current within the range of 75 to 85 milliamperes.

Increasing the potential difference between anode 13 and cathode 12 has the same effect as increasing the pressure, that of increasing both the rate of deposition and the current flow. Accordingly, the maximum voltage is dictated by considerations of the same factors controlling the maximum pressure.

The spacing between anode and cathode is not critical. However, the minimum separation is that required to produce a glow discharge which must be present for sputtering to occur. Many dark striations occur in the glow discharge produced during sputtering. Some of these are well known and have been given names, as, for example, "Crookes dark space." (See Joos, "Theoretical Physics," Hafner, New York, 1950, pages 435 et seq.) For the best efficiency during the sputtering step, substrate 14 should be positioned immediately without Crookes dark space on the side closest to anode 13, approximately 2 inches from cathode 12. Location of substrate 14 closer to cathode 12 results in a deposit of poorer quality. Locating substrate 14 further from cathode 12 results in the impingement on the substrate by a smaller fraction of the total metal sputtered, thereby increasing the time necessary to produce a deposit of given thickness.

It must also be noted that the location of Crookes dark space changes with variation in pressure; it moving closer to the cathode with increasing pressure. As the substrate is moved closer to the cathode it tends to act as an obstacle in the path of gas ions which are bombarding the cathode.

Accordingly, the pressure should be maintained sufficiently low so that Crookes dark space is located beyond the point at which a substrate would cause shielding of the cathode.

The balancing of these various factors of voltage, pressure and relative positions of the cathode, anode and substrate to obtain a high quality deposit is well known in the sputtering art.

With reference now more particularly to the example under discussion, by employing a proper voltage, pressure and spacing of the various elements within the vacuum chamber, a film of oxidized silicon-aluminum alloy is deposited upon substrate 14 in the form of a glass. Sputtering is conducted for a period of time calculated to produce the desired thickness.

For the purposes of this invention the thickness of the layer deposited on the substrate is within the range of 20 to 500,000 Angstroms depending on the desired use.

Following the deposition of the sputtered glass film, the substrate is inserted into a furnace and heated at temperatures within the range of 1000° to 1500° C. for a time period of the order of 1 to 2 hours, so producing the desired mullite of needle crystal habit. Although the indicated temperature limits are not absolute, it is preferred to remain in this range since there is generally no indication of a crystalline phase at temperatures appreciably less than 1000° C. The maximum temperature which may be employed is the melting point of the oxidized layer but preferably does not exceed 1500° C.

After sputtering the oxidized film of silicon-aluminum alloy it has been found advantageous to evaporate a film of carbon over the sputtered film, so permitting control of the size of the needle due to the catalytic effect of the impurity (carbon) on nucleation.

An example of the present invention is described in detail below. This example and the illustration described above are included merely to aid in the understanding of the invention, and variations may be made by one skilled in the art without departing from the spirit and scope of the invention.

*Example*

A sputtering apparatus similar to that shown in the figure was used to reactively sputter an amorphous film of the oxides of aluminum and silicon onto a smooth surface of a sodium chloride crystal (used as a substrate in experimental procedures only). The sputtering electrode was prepared as an alloy of silicon and aluminum and contained approximately 79 percent aluminum and 18 percent silicon. In the apparatus employed, the anode was grounded, the potential difference being obtained by making the cathode negative with respect to ground.

The vacuum chamber was initially evacuated to a pressure of the order of 1 micron of mercury, flushed with argon and oxygen and re-evacuated to 25 microns of mercury with the argon and oxygen flowing into the chamber.

The anode and cathode were spaced approximately 2 inches apart, the substrate being placed therebetween at a position immediately without Crooks dark space. A D.-C. voltage of approximately 1800 volts was impressed between cathode and anode.

Sputtering was conducted for 120 minutes producing an oxidized silicon-aluminum glass film, approximately 3600 Angstroms thick upon the sodium chloride crystal.

Following the sputtering, specimens of the film were prepared for examination by dissolving the sodium chloride in water to free the film for mounting portions thereof on small perforated discs of platinum. These discs of platinum are available for use in the electron microscope and were specifically used for that purpose.

The original oxide film was observed to be a continuous sheet having negligible relief and exhibiting an amorphous structure as indicated by the diffused rings of the electron diffraction patterns.

Heating of 4 samples was initiated next in accordance with the following program of temperature and time.

| Sample | Temperature, ° C. | Time, hours |
| --- | --- | --- |
| A | 500 | 1 |
| B | 800 | 1 |
| C | 1,055 | 1.5 |
| D | 1,200 | 2 |

The first indications of a crystalline phase of mullite appeared in sample C after heating for 1.5 hours at a temperature of approximately 1055° C. and this phase was of the needle habit as was seen under magnification of 20,000 times. Sample D was heated for 2 hours at 1200° C. and at that time almost the entire film had become multilayers of an abundance of needle-like crystals of mullite.

While the invention has been described in detail in the foregoing explanation and the drawing similarly illustrates the same, the aforesaid is by way of illustration only and is not restrictive in character. The several modifications which will readily suggest themselves to persons skilled in the art are all considered within the scope of this invention, reference being had to the appended claims.

What is claimed is:

1. A method for the preparation of mullite of needle crystalline habit which comprises the steps of sputtering a silicon-aluminum alloy upon a substrate in the presence of oxygen at a pressure within the range of 10 to 50 microns of mercury and a voltage of at least 30 volts, thereby forming an oxidized film having a composition within the range of 72–78% $Al_2O_3$, remainder $SiO_2$ of the silicon-aluminum alloy and, subsequently heating the said oxidized film at a temperature within the range of 1000 to 1500° C. for a time period of approximately 1 to 2 hours thereby converting the oxidized film into mullite of needle crystalline habit.

2. A method in accordance with claim 1 wherein said oxidized film is produced in the form of a glass having a thickness within the range of 20 to 500,000 Angstroms.

3. The method in accordance with claim 1 wherein said silicon-aluminum alloy is sputtered in the presence of oxygen at 25 microns of mercury and 1800 volts and subsequently heat treated at 1200° C. for 2 hours.

4. The method in accordance with claim 1 wherein a film of carbon is evaporated over the said oxidized film prior to heating.

References Cited in the file of this patent
UNITED STATES PATENTS

| | | |
|---|---|---|
| 2,636,855 | Schwarz | Apr. 28, 1953 |
| 2,641,044 | Bearer | June 9, 1953 |
| 2,678,282 | Jones | May 11, 1954 |
| 2,754,259 | Robinson | July 10, 1956 |
| 2,761,945 | Colbert | Sept. 4, 1956 |
| 2,825,687 | Preston | Mar. 4, 1958 |
| 2,874,077 | Joseph | Feb. 17, 1959 |

OTHER REFERENCES

Holland: "Vacuum Deposition of Thin Films," John Wiley & Sons, N.Y., 1956, pages 465 and 491.